(12) United States Patent
Roh

(10) Patent No.: US 7,593,385 B2
(45) Date of Patent: Sep. 22, 2009

(54) WIRELESS COMMUNICATION SYSTEM CAPABLE OF PERFORMING AN OPTIMIZED ROUTING AND METHOD OF MEASURING A MAGNITUDE OF A NETWORK

(75) Inventor: Yong-sung Roh, Icheon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 726 days.

(21) Appl. No.: 10/980,794

(22) Filed: Nov. 4, 2004

(65) Prior Publication Data

US 2005/0094594 A1    May 5, 2005

(30) Foreign Application Priority Data

Nov. 5, 2003   (KR) ...................... 10-2003-0078079

(51) Int. Cl.
  *G06F 15/16* (2006.01)
(52) U.S. Cl. ...................... 370/349; 370/328; 370/401
(58) Field of Classification Search ................ 370/728, 370/400, 401, 407, 349; 709/100, 252; 710/129
  See application file for complete search history.

(56) References Cited

U.S. PATENT DOCUMENTS

| | | | | |
|---|---|---|---|---|
| 5,115,495 A | * | 5/1992 | Tsuchiya et al. ............ 709/239 |
| 5,444,694 A | * | 8/1995 | Millet et al. ................ 370/224 |
| 6,947,433 B2 | * | 9/2005 | Carvey ....................... 370/401 |
| 7,155,518 B2 | * | 12/2006 | Forslow ...................... 709/227 |

* cited by examiner

Primary Examiner—Sam Bhattacharya
(74) Attorney, Agent, or Firm—Staas & Halsey LLP

(57) ABSTRACT

A wireless communication system capable of performing an optimized routing that includes a transmitting node transmitting a route request message including its own diameter option to all nodes existing in a communication area in a network, and a plurality of receiving nodes receiving the Route-Request message from the transmitting node, checking whether the receiving nodes themselves are terminal nodes located at terminals of a spanning tree to which the RREQ message is transmitted, and transmitting route reply messages including diameter reply options to the transmitting node when the receiving nodes themselves are the terminal nodes. The transmitting node measures a magnitude of the network based on the diameter reply options included in the Route receives messages. Accordingly, the respective node in the MANET measures the network range and actively use the measured information, and thus a routing optimized to the current circumstances of the network is performed.

31 Claims, 4 Drawing Sheets

FIG. 3

| Type | OPTION DATA LENGTH | Reserved | GRADE NUMBER |
|---|---|---|---|
| Previous Node's IP address | | | |

FIG. 4

| Type | OPTION DATA LENGTH | Current DM | Maximum DM |
|---|---|---|---|

FIG. 5

| Type | OPTION DATA LENGTH | Current DM | Maximum DM |
|---|---|---|---|
| LIFETIME OF RECEIVING NODE | | | |
| IP ADDRESS OF DIAMETER PROVIDER | | | |

WIRELESS COMMUNICATION SYSTEM CAPABLE OF PERFORMING AN OPTIMIZED ROUTING AND METHOD OF MEASURING A MAGNITUDE OF A NETWORK

CROSS-REFERENCE TO RELATED APPLICATION

This application claims benefit under 35 U.S.C. §119 from Korean Patent Application No. 2003-78079, filed on Nov. 4, 2003, the entire content of which is incorporated herein by reference.

BACKGROUND OF THE INVENTION

1. Field of the Invention

The present invention relates to a wireless communication system and method, and more particularly to a wireless communication system capable of performing an optimized routing and a method of measuring a magnitude of a network.

2. Description of the Related Art

With the development of the hardware technology and the increase in demand for portable terminals such as notebook computer, PDA (Personal Digital Assistant), etc., there exists a need for grafting the concept of wireless mobile communications on data communications based on the existing Internet protocol. A representative basic technology for this is an MP (Mobile IP) (hereinafter referred to as 'mobile IP').

Currently, a host, which uses a mobile IP in a wireless LAN (Local Area Network) environment, performs a handoff in two of OSI (Open System Interconnection) layers when the host moves from a present cell and moves to a new cell. A handoff performed in a MAC (Media Access Control) layer secures a reliable wireless link in the new cell, and a mobile IP handoff occurring in the IP layer provides a positional clarity of the host so that it is possible to continuously keep service during the movement of the host without changing the IP address.

A wireless LAN, which is a data communication system for providing mobility and scalability, facilitates its construction and management in comparison to the existing wire LAN, and currently provides a data transmission speed of approximately 11 Mbps. Also, the mobile host on the wireless LAN can receive an Internet service by connecting to the wire LAN at a high transmission speed at any location without a cable, i.e., wireless.

The standard of a physical layer and a data-link layer of the wireless LAN is described in the IEEE (Institute of Electrical and Electronics Engineers) 802.11. The wireless LAN is constructed by an ad-hoc network composed of a wireless terminal only or an infrastructure network that is connected to a wire LAN. A network in which nodes having mobility are autonomously constructed without any help of the existing infra-environment is referred to as a mobile ad-hoc network (MANET).

All nodes of the MANET are mobile; therefore, the structure of the network is dynamic and flexible. The MANET having such flexibility becomes a matter of great concern as a core network technology to deal with mobile terminal environments that are omnipresent, but it has several technical problems to be solved.

The MANET has a characteristic quite different from an existing infra-environment; therefore a separate routing design is required to support the MANET. A MANET working group in the IETF (Internet Engineering Task Force) is currently researching this design. Respective routing protocols discussed in the MANET working group are briefly classified into a proactive system and a reactive system.

The proactive system is an initially used routing algorithm for the ad-hoc network, and is also referred to as a table-driven system. The proactive system is provided by applying a Bellman-Ford system used in the Internet of a wire environment to the ad-hoc network. The proactive system continuously routes information of all mobile terminals in the ad-hoc network, and a respective mobile terminal periodically transfers the routing information to other mobile terminals, and when changing a routing path, the respective mobile terminal broadcasts its own routing information. The advantage of the proactive system is that a delay time for obtaining a route is shortened by continuously keeping the routing information of other mobile terminals in a routing table, and thus directly transmitting data packets using the information of the routing table without performing a separate algorithm for searching for the route if the data packets to be transmitted are produced. However, since the proactive system should continuously and periodically broadcasts the routing information while the network is maintained, the number of packets of the routing information increases according to a square of the number of nodes in the ad-hoc network in which the use of radio frequencies is limited, and this burdens the network.

The reactive system is referred to as an on-demand system. The reactive system does not always keep the entire route for all of the mobile terminals in the network as in the proactive system, but instead obtains a route only when the data transmission is required. Since the reactive system does not keep the routing information, and obtains the routing information only in case of need, it is not required to broadcast the changed routing information to the mobile terminals when the mobile terminal moves. However, because data is transmitted after performing a procedure to obtain the routing information, the time required for obtaining the routing information increases, and thus the reactive system is unsuitable to a real-time communication.

The proactive system and the reactive system commonly transmit a control message for searching for or informing a newest route information to the whole network. The transmitting route for such a control message forms a minimum spanning tree.

In such a route discovery process, a timeout value for the control message is a very important factor that determines the performance of the system. If a large timeout value is set in a small-sized ad-hoc network, it takes a lot of time to perform a new route discovery process if the route discovery fails. By contrast, if a small timeout value is set in a large-sized ad-hoc network, the transmission range of the control message is limited, and the route discovery process may fail to search for a node located in a far-off location. Accordingly, the timeout value, which corresponds to a waiting time after the control message is transmitted to the whole network, is typically set depending on the magnitude of the network.

However, the routing protocols on the ad-hoc network do not propose any mechanism for measuring the magnitude of the network. In most cases, a specified constant value is set and assumed as the magnitude of the network for each routing protocol. Such assumption may cause a severe problem in performance due to an inaccurate recognition of the magnitude of the network when the control message is transmitted for the route discovery.

A ring-search algorithm has been proposed as a method of reducing the number of control messages when searching for the route in the MANET. A node that uses the ring-search algorithm transmits a message to adjacent nodes, and whenever the transmission fails, the node increases the transmission range and re-transmits the message. This algorithm is useful because it can reduce the number of messages transmitted when a destination node is adjacent to the transmitting node. However, when the destination to be searched for exists further away from the transmitting node or does not exist on the network, the limit for increasing the transmission range cannot be determined only by the corresponding algorithm. Accordingly, in order to apply the corresponding algorithm to the network, the range of the network to which the node belongs must be known in advance.

SUMMARY OF THE INVENTION

The invention has been developed in order to solve the above-described and/or other drawbacks and problems associated with the conventional arrangement of a wireless communication network. An aspect of the present invention is to provide a wireless communication system capable of performing a routing that is optimized to the current circumstances of the network and a method of measuring a magnitude of the network.

The foregoing and/or other objects and advantages are realized by providing a wireless communication system that includes a transmitting node for transmitting a route request (RREQ) message including its own diameter option to all nodes existing in a communication area in a network, and a plurality of receiving nodes for receiving the RREQ message from the transmitting node, checking whether the receiving nodes themselves are terminal nodes located at terminals of a spanning tree to which the RREQ message is transmitted, and transmitting route reply (RREP) messages including diameter reply options to the transmitting node when the receiving nodes themselves are the terminal nodes. The transmitting node measures a magnitude of the network based on the diameter reply options included in the RREP messages.

In another aspect of the invention, the transmitting node includes a storage unit for storing a lifetime value of the transmitting node, a network magnitude value, and an address value of the node that just performed a measurement of the network magnitude, and a diameter option generating unit for generating the diameter option based on the lifetime value, the network magnitude value and the address value stored in the storage unit.

According to another aspect of the invention, the receiving node includes a terminal node checking unit for checking whether the receiving node itself is the terminal node, and a diameter reply option generating unit for generating the diameter reply option including the number of hops of the RREQ message when it is judged that the receiving node itself is the terminal node by the terminal node checking unit. The number of hops is the number of RREQ messages transmitted from the transmitting node to the terminal node According to another aspect of the invention, it is preferable that the transmitting node further includes a message checking unit for checking whether the diameter reply options are included in the RREP messages received from the receiving nodes, and when it is checked that the diameter reply options are included in the RREP messages by the message checking unit, the transmitting node re-calculates the network magnitude based on the diameter reply options.

In order to achieve the above and/or other aspects of the invention, a method of measuring a magnitude of a network for a wireless communication system, a receiving node receiving a route request (RREQ) message from a transmitting node and checking whether the receiving node itself is a terminal node located at a terminal of a spanning tree to which the RREQ message is transmitted with respect to the RREQ message, when it is checked that the receiving node itself is the terminal node, transmitting a route reply (RREP) message including a diameter reply option to the transmitting node, and the transmitting node calculating a magnitude of the network based on the RREP message.

The above method may further include having the RREP message transmitted include the number of hops of the RREQ message. Further, the transmitting node calculates the magnitude of the network based on current diameter values and maximum diameter values based on the received RREP message.

Consequently, according to an aspect of the invention, the wireless communication system enables the respective node itself in the MANET to measure the range of the network and positively use measured information in order to perform a routing optimized to the current circumstances of the network.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a view illustrating an example of a diameter option according to an embodiment of the invention;

FIG. 4 is a view illustrating an example of a diameter reply option according to an embodiment of the invention;

FIG. 5 is a view illustrating another example of a diameter reply option according to an embodiment of the invention;

DETAILED DESCRIPTION OF THE PREFERRED EMBODIMENTS

Figure 1:
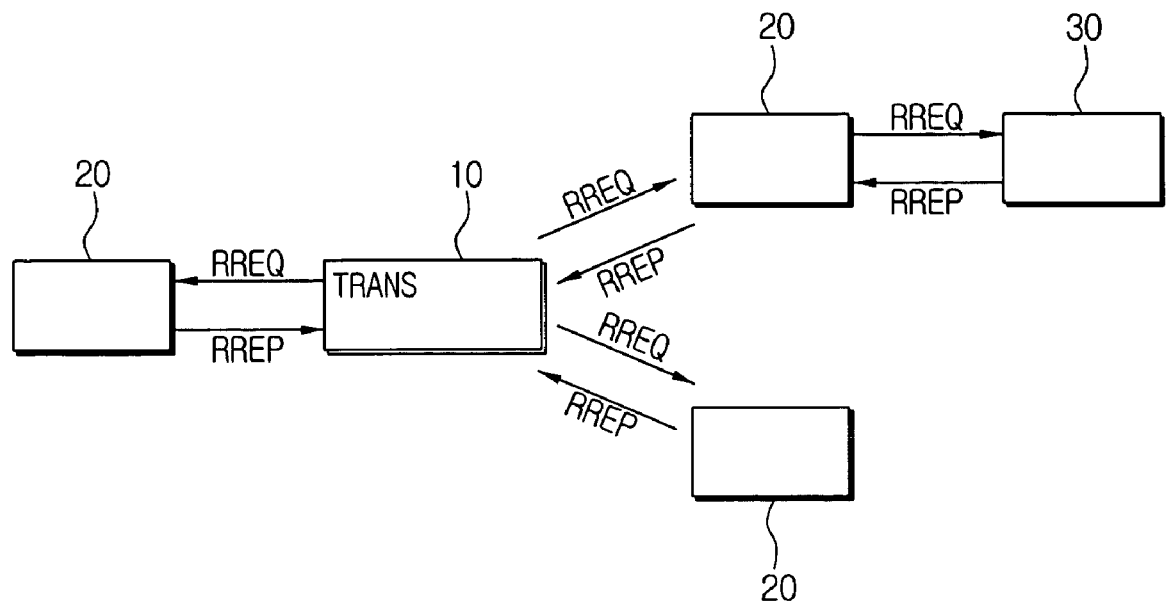
FIG. 1 is a block diagram schematically illustrating a wireless communication system according to an embodiment of the invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram schematically illustrating a wireless communication system according to an aspect of the invention. Referring to FIG. 1, the wireless communication system includes a transmitting node 10 for transmitting a route request (RREQ) message including its own diameter option to all nodes existing in a communication area in a network, and a plurality of receiving nodes 20 for receiving the RREQ message from the transmitting node 10. The receiving nodes 20 check whether the receiving nodes themselves are terminal nodes located at terminals of a spanning tree of the RREQ message transmitted from the transmitting node 10, and transmitting route reply (RREP) messages including diameter reply options to the transmitting node 10 when it is checked that the receiving nodes themselves are the terminal nodes.

Here, although FIG. 1 shows that the transmitting node 10 and the receiving nodes 20 are separately provided in the wireless communication system, the transmitting node 10 and the receiving nodes 20 are not necessarily separately provided, and the respective appliances may serve as both the transmitting node 10 and the receiving nodes 20.

Figure 2:
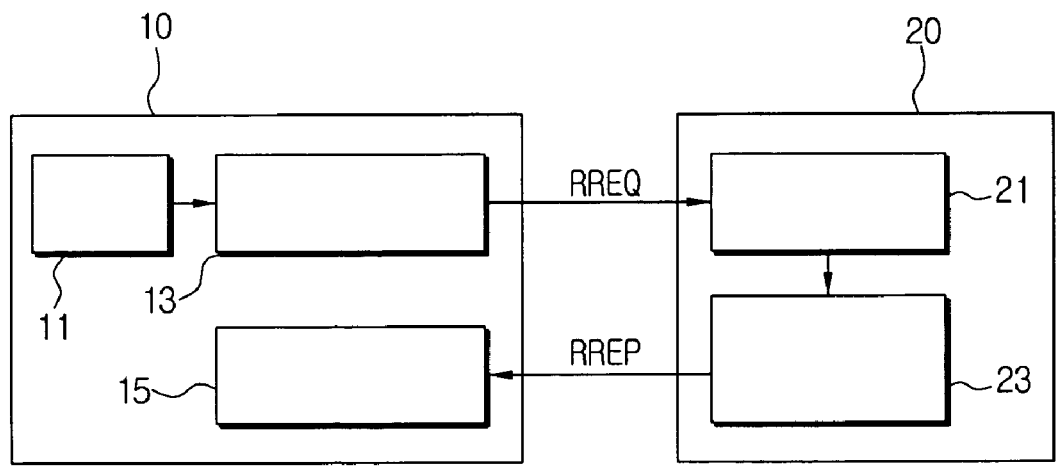
FIG. 2 is a block diagram schematically illustrating a transmitting node and receiving nodes that constitute the wireless communication system of FIG. 1.

FIG. 2 is a block diagram schematically illustrating a transmitting node 10 and receiving nodes 20 that constitute the wireless communication system of FIG. 1. Referring to FIG. 1, the transmitting node 10 is provided with a storage unit 11, a diameter option generating unit 13, and a message checking unit 15. Also, the receiving node 20 is provided with a terminal node checking unit 21 and a diameter reply option generating unit 23.

The storage unit 11 stores a lifetime value of the transmitting node 10, a network magnitude value, and an address value of the node that has performed the measurement of the network magnitude value. Here, the network magnitude value refers to the magnitude value of the network measured by the transmitting node 10, and the address value of the node that performed the measurement of the network magnitude value refers to the address value of the transmitting node 10 that performed the measurement of the network magnitude just before a wireless communication appliance that operates as the transmitting node 10 from among a plurality of wireless communication appliances that constitute the network.

The diameter option generating unit 13 generates the diameter option based on the lifetime value, the network magnitude value, and the address value of the node that measured the network magnitude value. An example of the diameter option generated by the diameter option generating unit 13 is shown in FIG. 3.

The diameter option generated by the diameter option generating unit 13 is included in the existing RREQ (Route Request) packet. Here, the RREQ packet is a packet used for the mobile terminal that transmits data to obtain the route when there is no route to the corresponding destination from among the routes stored in the routing table of the mobile terminal or when the route is not available. Among the constituent elements of the RREQ packet, "Type" refers to a kind of packet, and "Reserved" is set to '0' during transmission and disregarded during reception.

According to an aspect of the invention, information on the length of the option data, the address of the previous node, the grade number, etc., are added to the RREQ packet. Further, although not shown in FIG. 3, the RREQ packet may include a hop count that indicates the number of hops corresponding to a distance from a departure node of the RREQ packet to a node that received the RREQ packet, an address of a destination node that the RREQ packet should reach, a broadcast ID that indicates a serial number of RREQ packet generation, etc.

The message checking unit 15 checks whether the diameter reply option is included in the RREP (Route Reply) message received from the receiving node 20 in response to the RREQ message transmitted by the transmitting node 10. That is, the transmitting node 10 transmits the RREQ message that includes the diameter option of the transmitting node 10 to all the nodes existing in the communication area of the network, and the terminal node checking unit 21 of the respective receiving node 20 checks whether the receiving node 20 is the terminal node of the spanning tree of the RREQ message.

When it is checked that the receiving node 20 is the terminal node of the spanning tree of the RREQ message by the terminal node checking unit 21, the diameter reply option generating unit 23 generates a diameter reply option that includes the number of hops of the RREQ message. An example of the diameter reply option generated by the diameter reply option generating unit 23 is shown in FIG. 4.

The diameter reply option generated by the diameter reply option generating unit 23 is added to the RREP message and then transmitted to the transmitting node 10. Here, the RREP packet is a packet used to respond to the RREQ packet when an intermediate node that received the RREQ packet includes an available route to the destination node or when the receiving node 20 is the corresponding destination node.

According to an aspect of the invention, the diameter reply option added to the RREP packet includes length information of the option data, the current diameter value of the receiving node 20, and the maximum diameter value of the receiving node 20. Also, as shown in FIG. 5, the diameter reply option may be implemented to include a lifetime value of the receiving node 20, and an IP address of a diameter value provider.

The RREP packet to which the diameter reply option is added by the diameter reply option generating unit 23 is transmitted to the transmitting node 10. The message checking unit 15 of the transmitting node 10 checks whether the diameter reply option is included in the RREP message received from the receiving node 20. When it is checked that the diameter reply option is included in the RREP message by the message checking unit 15, the transmitting node 10 re-calculates the magnitude of the network based on the diameter reply option.

Figure 6:
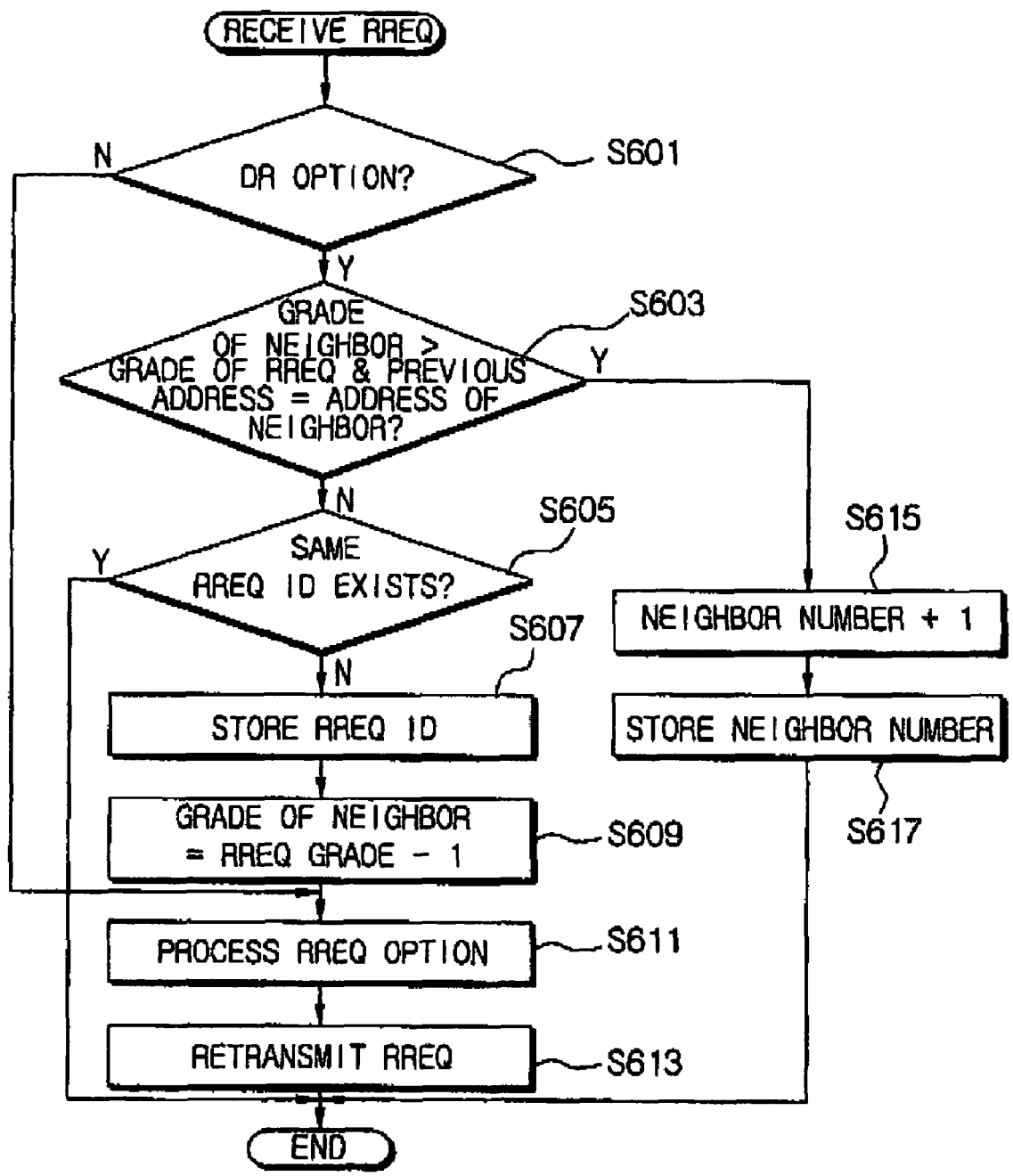
FIG. 6 is a flowchart illustrating a process of transmitting a Route-Request message in a method of measuring a magnitude of a network according to an aspect of the invention.

FIG. 6 is a flowchart illustrating a process of transmitting an RREQ message during a method of measuring a magnitude of a network according to an aspect of the invention. Referring to FIG. 6, the process of transmitting RREQ message will be explained in more detail.

A respective node in a network stores a magnitude (i.e., range) value of the network in the storage unit 11, and the respective node also stores the lifetime and an address value of the node that measured the magnitude value of the network.

When a wireless communication appliance as the transmitting node 10 is the node that measured the magnitude of the network, the transmitting node 10, at a time point when more than ½ of the lifetime elapses, generates the RREQ message in order to re-measure the magnitude value of the network, and transmits the generated RREQ message to neighbor nodes. The neighbor nodes refer to the nodes that exist in the communication area of the transmitting node 10 from among all the nodes in the network. Here, the RREQ message includes the diameter option, as shown in FIG. 3, in addition to the existing RREQ message. Thus, to improve efficiency, the RREQ message may be transmitted, i.e., piggybacked, when a general RREQ message for searching for a specified destination route is sent.

The neighbor node that received the RREQ message checks whether the corresponding RREQ message includes the diameter option (S601). When it is judged that the RREQ message does not include the diameter option, the node processes the received RREQ message in accordance with the existing RREQ message processing method. At this time, when the node is the destination node, the destination node transmits the RREP message that does not include the diameter option to the transmitting node 10 in response to the RREQ message, and the destination node re-transmits the RREQ message that includes the diameter option to the neighbor nodes, so that a proper process can be performed with respect to the piggybacked and transmitted RREQ message.

The terminal node checking unit 21 of the receiving node 20 that received the RREQ message checks whether the receiving node 20 itself is the terminal node located at a terminal of the spanning tree of the RREQ message. The transmitting node 10 that transmitted the RREQ message waits to receive a response for a predetermined time (hereinafter referred to as a 'waiting time'). According to an aspect of the invention, the waiting time is set to a time when a message of approximately 2 to 3 hops can reach the transmitting node 10. When another RREQ message, which has a grade number, i.e., total number of hops, that is lower than the grade number of the previous RREQ message and which has the same RREQ ID, is received within the waiting time, and when the previous node address in the diameter option is its own address (S603), the transmitting node 10 increases the number of neighbor nodes one by one (S615). The increased number of neighbor nodes is stored in the storage unit 11 (S617). When the number of neighbor nodes is '0' after the waiting time elapses, i.e., when another RREQ message, which has a grade number lower than that of the previous RREQ message, is not received within the waiting time and when the previous node address in the diameter option is not its own address, or when the same RREQ ID does not exist (S605), the terminal node checking unit 21 judges that the corresponding node itself is the terminal node. The diameter reply option generating unit 23 then transmits the RREP message that includes the diameter reply option to the transmitting node 10. The destination of the RREP message is then set to the transmitting node 10 of the RREQ message, and the RREP message includes the diameter reply option, as shown in FIG. 4. Hereinafter, the process of transmitting the RREP message will be explained in detail.

When the received RREQ message includes the diameter option, the corresponding node records an ID of the RREQ message (S607). The recorded ID refers to the collection of the RREQ message that will be replied to the transmitting node. Here, the respective node decreases the grade number included in the RREQ message by 1, and stores the decreased grade number (S609). Also, the respective node stores its own IP address in the diameter option. This is used to grasp the number of neighbor nodes. Also, the corresponding node stores the reply route of the RREP message corresponding to the RREQ message. This process varies according to the respective routing protocols, and is performed according to the corresponding routing protocol. Thereafter, the corresponding node performs the same process as the existing RREQ message (S611), and re-transmits the received RREQ message to the neighbor nodes.

Figure 7:
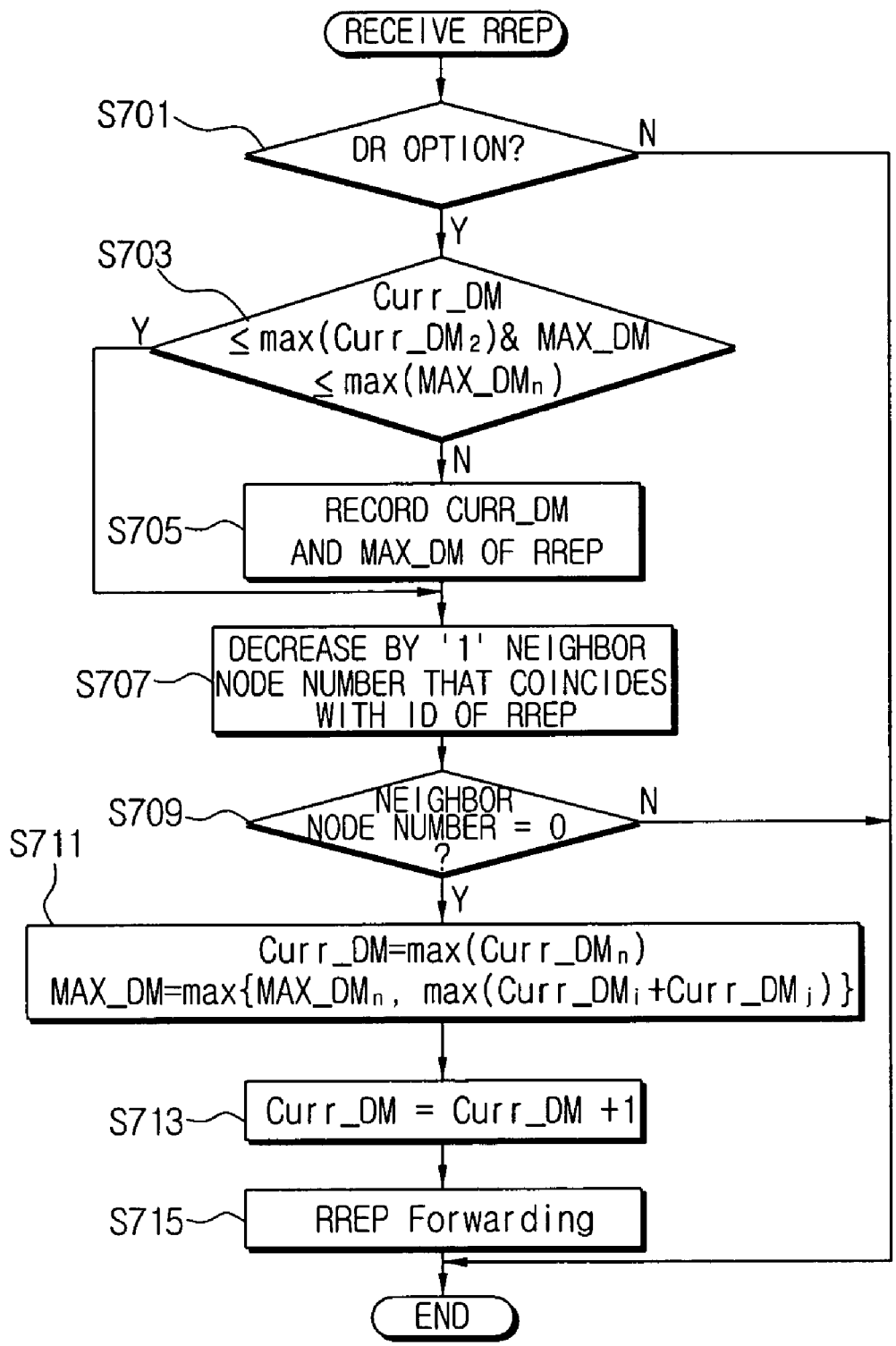
FIG. 7 is a flowchart illustrating a process of transmitting a Route-Request message in a method of measuring a magnitude of a network according to an aspect of the invention.

FIG. 7 is a flowchart illustrating a process of transmitting an RREP message in a method of measuring a magnitude of a network according to an aspect of the invention. Referring to FIG. 7, the process of transmitting an RREP message will be explained in more detail.

The receiving node 20 transmits the RREP message in a reverse order of the route of the RREQ message received from the transmitting node 10. For this, the receiving node uses the information stored during the RREQ message receiving process, which follows the method used in the respective routing protocol.

The node that receives the RREP message first judges whether the RREP message includes the diameter reply option (S701). When it is judged that the RREP message does not include the diameter reply option, the corresponding node discards the received RREP message. Also, the corresponding node checks whether a table corresponding to the ID exists in the RREP message. When it is checked that the table corresponding to the ID does not exist in the RREP message, the corresponding node discards the received message.

In the storage unit of the corresponding node, i.e., in the storage unit 11 of the wireless communication appliance that operates as the receiving node 20, the current diameter value and the maximum diameter value of the RREP message are recorded (S705). At this time, it is not required to record the current diameter value Curr_DM and the maximum diameter MAX_DM of the RREP message having a small number of hops. That is, data of the RREP message, of which the maximum diameter value is smaller than the largest one among the maximum diameter values currently stored, and simultaneously, of which the current diameter value is smaller than the second largest one among the diameter values currently stored, is not recorded.

The receiving node 20 decreases the number of neighbor nodes stored together with the ID of the RREP message by '1' (S707). At this time, when no reply is received with respect to all the RREQ messages, i.e., when the number of neighbor nodes is not yet '0' (S709), the receiving node 20 does not transmit the RREP message.

When the number of neighbor nodes is '0' (S709), the corresponding node is in a state such that it received all the RREP messages with respect to the RREQ messages transmitted by the node itself. At this time, in order to set the diameter reply option value of the RREP message to be transmitted to an upper node, the corresponding node calculates the maximum number of hops through the current diameter value and the maximum diameter value stored in the storage unit 11. The largest node among the current diameter values becomes the current diameter value of the RREP message to be transmitted, and the largest node among values obtained by adding the largest node among the maximum diameter values to the largest one among the current diameter values becomes the maximum diameter value of the RREP message to be transmitted. Further, when the initial number of neighbor nodes is 1, only one current diameter value exists, and thus the previous value is maintained (S711).

After applying the current diameter value and the maximum diameter value calculated as described above to the diameter option of the existing RREP message, the RREP message is transmitted to the upper node. If the number of neighbor nodes does not reach '0' for a predetermined time, the corresponding node sets a proper value in an error code of the diameter reply option, and calculates the current diameter value and the maximum diameter value through the operations S709 and S711 with reference to the diameter values collected up to now to transmit them to the upper node. At this time, '1' is added to the current diameter value that is transmitted to the upper node (S713), and the added current diameter value is forwarded (S715).

The source node, which transmitted the RREQ message among the transmitting nodes 10, receives the messages from all the neighbor nodes, and calculates the current diameter value and the maximum diameter value. The calculation method is as described above, and the respective values at this time have the following meanings:

Maximum value among the current diameter values: The largest number of hops among routes from the transmitting nodes 10 to the terminal node Value obtained by adding two largest values among the current diameter values: The number of hops of the longest route among the routes passing through the transmitting nodes 10

Maximum diameter value: The number of hops of the longest route among the routes that pass or do not pass through the corresponding nodes According to an aspect of the invention, the transmitting node 10 selects the maximum diameter value from among the three values as the network range value, and stores the remaining values in the storage unit 11 as a reference.

The transmitting node 10, after newly obtaining the maximum diameter value, stores the maximum diameter value in the storage unit 11 along with the transmitting node's lifetime value and the address of the node that measured the network magnitude value. When more than ½ of the lifetime value elapses, the transmitting node 10 repeats the above-described process in order to obtain a new maximum diameter value when the node that measured the network magnitude is the transmitting node itself. If the node that measured the network magnitude is not the transmitting node itself, the transmitting node does not measure the network magnitude value.

After the lifetime is terminated, the table that stores the corresponding diameter value is deleted and the network magnitude value is set to the basic value of the respective routing protocol; however, the lifetime is not set. As described above, in order to obtain a new network magnitude value, the above-described process is repeated periodically.

When the respective node in the network actually transmits the packet after obtaining the network magnitude value through the above-described process, the respective node may include the diameter information option as shown in FIG. 5. All the nodes that received the diameter information option compare the diameter information option with their own network information values, respectively. When the lifetime value is greater than the magnitude value owned by the respective node, the corresponding node recognizes this as a newest information, and updates its own network information value to the value in the diameter information option.

When the magnitude value owned by the respective node is greater than the lifetime value, the corresponding node updates the diameter information option to the value own by the node itself. In other cases, the network magnitude value is not updated. The obtained network magnitude value is stored in the storage unit 11 to be managed.

According to an aspect of the invention, the respective node that belongs to the MANET measures the range of the network, and the information on the network range is very useful in the MANE since the MANET frequently changes. Also, the respective node, by measuring a network range and actively using the measured information, performs a routing optimized to the current circumstances of the network, or estimates the current circumstances of the network.

According to another aspect of the invention, the RREQ message used during the route discovery process is transmitted to the entire network in order to search for the routes to all the destinations, and thus the timeout value of the RREQ message should be set according to a network magnitude. However, according to an aspect of the invention, since the respective node accurately grasps the network magnitude, the timeout value is optimized during the route discovery, and thus the performance of the system is improved.

As described above, according to an aspect of the invention, the respective node in the MANET measures the network range and actively uses the measured information, and thus a routing optimized to the current circumstances of the network is performed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A wireless communication system comprising:
a transmitting node transmitting a route request message including a diameter option of the transmitting node to all nodes existing in a communication area in a network; and
a plurality of receiving nodes receiving the route request message from the transmitting node, checking the plurality of receiving nodes to determine whether any of the receiving nodes is a terminal node located at a terminal of a spanning tree to which the route request message is transmitted, and transmitting route reply messages including diameter reply options to the transmitting node when one of the plurality of receiving nodes is determined to be the terminal node;
wherein the transmitting node measures a magnitude of the network according to the diameter reply options included in the route reply messages.

2. The wireless communication system as claimed in claim 1, wherein the transmitting node comprises:
a storage unit storing a lifetime value of the transmitting node, a network magnitude value, and an address value of the node that just performed a measurement of the network magnitude; and
a diameter option generating unit generating the diameter option according to the lifetime value, the network magnitude value and the address value stored in the storage unit.

3. The wireless communication system as claimed in claim 2, wherein the receiving node comprises:
a terminal node checking unit checking whether the receiving node is the terminal node and
a diameter reply option generating unit generating the diameter reply option including a number of hops of the route request message when the receiving node is the terminal node.

4. The wireless communication system as claimed in claim 3, wherein the transmitting node further comprises:
a message checking unit checking whether the diameter reply options are included in the route reply messages received from the receiving nodes,
wherein when the diameter reply options are included in the route reply messages, the transmitting node re-calculates the network magnitude according to the diameter reply options.

5. A method of measuring a magnitude of a network, comprising:
a receiving node receiving a route request message and checking whether the receiving node is a terminal node located at a terminal of a spanning tree of which the route request message is transmitted with respect to the route request message;
transmitting a route reply message that includes a diameter reply option to the transmitting node when the receiving node is the terminal mode; and
calculating a magnitude of the network based on the route reply message.

6. The method as claimed in claim 5, wherein the route reply message that includes the diameter reply option is transmitted to the transmitting node when the receiving node is the terminal mode and includes a number of hops of the route request message.

7. The method as claimed in claim 6, wherein the transmitting node calculates the magnitude of the network based on current diameter values and maximum diameter values according to the received route reply message.

8. A wireless communication system setting a timeout value transmitting a control message that searches newest route information in a wireless network, the wireless communication system comprising:
   a transmitting node transmitting a route request packet including a diameter option;
   a receiving node that receives the route request packet including the diameter option and transmits a route reply packet including a diameter reply option that indicates a number of hops of the route request package to the transmitting node when the receiving node is a terminal node of a spanning tree of the route request message or is an intermediate node that includes an available route to the terminal node,
   wherein the transmitting node calculates the magnitude of the network according to the diameter reply option and uses the calculated magnitude to set an appropriate timeout value the transmitting node to wait the control message to be transmitted to the entire network.

9. The wireless communication system setting the timeout value transmitting the control message as claimed in claim 8, wherein the route request packet further comprises:
   a hop counter to track the number of hops of the route request packet originating from the transmitting node,
   wherein the number of hops is the number of route request messages transmitted from the transmitting node to a terminal node.

10. The wireless communication system setting the timeout value transmitting the control message as claimed in claim 8, wherein the diameter option is based on a lifetime value of the node, a network magnitude value, and an address value of the receiving node that measured the magnitude of the network.

11. The wireless communication system setting the timeout value transmitting the control message as claimed in claim 8, wherein the wireless network is an ad-hoc network that is either a proactive system or a reactive system.

12. The wireless communication system setting the timeout value transmitting the control message as claimed in claim 8, wherein a transmitting route of the control message forms a minimum spanning tree.

13. The wireless communication system setting the timeout value transmitting the control message as claimed in claim 8, wherein the transmitting node comprises:
   a storage unit storing a lifetime value of the transmitting node, a network magnitude value, and an address value of the node that measured the network magnitude; and
   a diameter option generating unit generating the diameter option according to the information stored in the storage unit.

14. The wireless communication system setting the timeout value transmitting the control message as claimed in claim 8, wherein the receiving node comprises:
   a terminal node checking unit checking whether the receiving node is the terminal node; and
   a diameter reply option generating unit generating the diameter reply option indicating the number of hops of the route request message when the route request message is received by the terminal receiving node.

15. The wireless communication system setting the timeout value transmitting the control message as claimed in claim 13, wherein the diameter option generated by the diameter option generating unit further includes an address of a destination node that the route request packet should reach.

16. The wireless communication system setting the timeout value transmitting the control message as claimed in claim 13, wherein the route request packet is used to transmit data to obtain a route when there is no route to a corresponding destination.

17. The wireless communication system setting the timeout value transmitting the control message as claimed in claim 8, wherein the transmitting node and the receiving node are included in a respective appliance.

18. The wireless communication system setting the timeout value transmitting the control message as claimed in claim 8, further including a wireless communication appliance to operate as the transmitting node and at least one additional wireless communication appliance to operate as the receiving node.

19. A method of measuring a magnitude of a network transmitting a control message that searches newest route information, the method comprising:
   generating a route request message to calculate a magnitude of the network at a time point when more than one-half of a lifetime value of the transmitting node elapses;
   transmitting the generated route request packet including a diameter option to a receiving node; and
   determining whether the receiving node is a terminal node and transmitting to the transmitting node a corresponding route reply packet indicating a number of hops of the route request packet when the receiving node is the terminal node, and re-transmitting the route request packet to additional neighbor nodes from the receiving node when the receiving node is not the terminal node,
   wherein the magnitude of the network is calculated according to the diameter reply option and the calculated magnitude is used to set the lifetime value for the time the transmitting mode waits for the control message to be transmitted to the entire network.

20. The method of measuring the magnitude of the network as claimed in claim 19, further comprising:
   checking whether the received route request packet includes the diameter option and processing the received route request packet in accordance with a predetermined route request packet processing method when the route request packet does not include the diameter option.

21. The method of measuring the magnitude of the network as claimed in claim 19, further comprising:
   waiting a predetermined period of time for the transmitting node to receive a route reply packet in response to the transmitted control message.

22. The method of measuring the magnitude of the network as claimed in claim 21, further comprising:
   setting the waiting time according to the number of hops indicated in the route reply packet.

23. The method of measuring the magnitude of the network as claimed in claim 19, further comprising, wherein the waiting time is set to a time corresponding to a period of not more than three hops.

24. The method of measuring the magnitude of the network as claimed in claim 22, further comprising:
   determining the receiving node to be the terminal node when the receiving node does not re-transmit the route request packet to a neighbor node within the waiting time; and
   transmitting the route reply packet that includes the diameter rely option to the transmitting node of the route request packet.

25. The method of measuring the magnitude of the network as claimed in claim 19, further comprising:

transmitting the route reply packet in a reverse order of a route of the route request packet received from the transmitting node.

26. The method of measuring the magnitude of the network as claimed in claim 25, further comprising:
   determining whether the transmitted route reply packet includes a diameter reply option; and
   discarding the received route request packet when the route request packet does not include the diameter reply option.

27. The method of measuring the magnitude of the network as claimed in claim 26, further comprising:
   storing a current diameter value and a maximum diameter value of the route reply packet in the receiving node,
   wherein the current diameter value and the maximum diameter value are not stored when a previously stored diameter value and a previously stored maximum diameter value, respectively, are smaller.

28. The method of measuring the magnitude of the network as claimed in claim 27, wherein the transmitting node receives route reply packets from the receiving node and the neighbor nodes, and calculates the current diameter value and the maximum diameter value from the received route reply packets.

29. The method of measuring the magnitude of the network as claimed in claim 28, wherein the transmitting node sets the maximum diameter value as a network range value.

30. The method of measuring the magnitude of the network as claimed in claim 19, further comprising:
   comparing the diameter option from the received route request packet with network information stored in the receiving node;
   recognizing the newest route information when a lifetime value is greater than the magnitude value of the transmitting node; and
   updating the network information stored in the receiving node according to the recognize newest route information.

31. The method of measuring the magnitude of the network as claimed in claim 19, further comprising:
   transmitting the route request packet to the entire network in order to search for routes to all destinations in the network,
   wherein the receiving node measures network range and actively uses the measured network range to optimize a routing method.

* * * * *

UNITED STATES PATENT AND TRADEMARK OFFICE
CERTIFICATE OF CORRECTION

PATENT NO.        : 7,593,385 B2
APPLICATION NO.   : 10/980794
DATED             : September 22, 2009
INVENTOR(S)       : Yong-sung Roh Page 1 of 1

It is certified that error appears in the above-identified patent and that said Letters Patent is hereby corrected as shown below:

Column 10, Line 35, change "node and" to --node; and--.

Signed and Sealed this

Twenty-second Day of December, 2009

David J. Kappos
*Director of the United States Patent and Trademark Office*